(12) United States Patent
Said et al.

(10) Patent No.: US 9,632,802 B2
(45) Date of Patent: Apr. 25, 2017

(54) AUTOMATIC CONFIGURATION OF MOBILE PROGRAMS

(71) Applicants: Bare Said, St. Leon (DE); Peter Eberlein, Malsch (DE)

(72) Inventors: Bare Said, St. Leon (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 13/918,178

(22) Filed: Jun. 14, 2013

(65) Prior Publication Data
US 2014/0372981 A1 Dec. 18, 2014

(51) Int. Cl.
G06F 9/44 (2006.01)
G06F 9/445 (2006.01)

(52) U.S. Cl.
CPC ............... *G06F 9/44505* (2013.01)

(58) Field of Classification Search
None
See application file for complete search history.

(56) References Cited

U.S. PATENT DOCUMENTS

| | | |
|---|---|---|
| 7,117,258 B2 | 10/2006 | Lee et al. |
| 8,069,242 B2 | 11/2011 | Hadar et al. |
| 8,201,189 B2 | 6/2012 | Semerdzhiev et al. |
| 8,214,653 B1 | 7/2012 | Marr et al. |
| 8,229,906 B2 | 7/2012 | Semerdzhiev |
| 8,271,769 B2 | 9/2012 | Kilian et al. |
| 8,307,437 B2 | 11/2012 | Sebes et al. |
| 8,375,130 B2 | 2/2013 | Eberlein et al. |
| 8,429,639 B2 | 4/2013 | Jirka |
| 2003/0169713 A1 | 9/2003 | Luo |
| 2009/0110156 A1 | 4/2009 | Hosteny et al. |
| 2010/0058319 A1 | 3/2010 | Kawaguchi et al. |
| 2010/0153149 A1 | 6/2010 | Prigge et al. |
| 2010/0192143 A1 | 7/2010 | Ingle et al. |
| 2010/0205594 A1 | 8/2010 | Jirka |

(Continued)

OTHER PUBLICATIONS

Meng, et al., "Improving the scalability of data center networks with traffic-aware virtual machine placement," Mar. 2010, In INFOCOM, Proceedings IEEE, pp. 1-9.

(Continued)

*Primary Examiner* — Chuck Kendall
(74) *Attorney, Agent, or Firm* — Mintz Levin Cohn Ferris Glovsky and Popeo, P.C.

(57) ABSTRACT

The subject matter disclosed herein provides methods for automatically configuring a mobile program based on a customer's access to one or more applications. This method may maintain metadata for a mobile program in a directory. The mobile program may be configured to provide one or more services when installed on a mobile device. Each service may be associated with one or more applications. Customer landscapes identifying applications accessible by a customer may be maintained in the directory. A program identifier may be received from a mobile device of the customer. The program identifier may identify a mobile program installed on the customer's mobile device. A configuration file may be generated based on the received program identifier and transmitted to the customer's mobile device. Related apparatus, systems, techniques, and articles are also described.

21 Claims, 7 Drawing Sheets

(56) References Cited

U.S. PATENT DOCUMENTS

| | | |
|---|---|---|
| 2010/0257522 A1 | 10/2010 | Malamud et al. |
| 2011/0004499 A1 | 1/2011 | Zhang et al. |
| 2011/0004735 A1 | 1/2011 | Arroyo et al. |
| 2011/0061046 A1 | 3/2011 | Phillips |
| 2011/0126197 A1 | 5/2011 | Larsen et al. |
| 2011/0145526 A1 | 6/2011 | Parham et al. |
| 2011/0161952 A1 | 6/2011 | Poddar et al. |
| 2011/0255675 A1 | 10/2011 | Jasper et al. |
| 2011/0296403 A1 | 12/2011 | Janzen |
| 2011/0302583 A1 | 12/2011 | Abadi et al. |
| 2012/0047239 A1 | 2/2012 | Donahue et al. |
| 2012/0079095 A1 | 3/2012 | Evans et al. |
| 2012/0131101 A1 | 5/2012 | Said et al. |
| 2013/0085810 A1 | 4/2013 | Driesen et al. |
| 2013/0117337 A1 | 5/2013 | Dunham |
| 2014/0109078 A1* | 4/2014 | Lang et al. .................. 717/172 |

OTHER PUBLICATIONS

Munro, "Virtual Machines & VMware, Part I.", Dec. 21, 2001, Available at: http://atlas.binus.ac.id/PDC/EasWeb2.nsf/0/d6f02e9dba8b088247256bf7001f3bd3/$ Fl LEIVirtual%20Machines%20VMware.pdf, 21 pp.

Patil et al., "Run-time dependency tracking in data centers," 2010, In Proceedings of the Third Annual ACM Bangalore Conference (COMPUTE '10) ACM, New York, NY, USA, Article 5 , 6 pp.

Aguiar et al., "The application of distributed virtual machines for enterprise computer management: a two-tier network file system for image provisioning and management," 2008, 32nd Annual IEEE International, pp. 428-431.

U.S. Notice of Allowance dated Jan. 2, 2014 in U.S. Appl. No. 13/197,794.

* cited by examiner

AUTOMATIC CONFIGURATION OF MOBILE PROGRAMS

TECHNICAL FIELD

This disclosure relates generally to the automatic configuration of mobile programs installed on mobile devices.

BACKGROUND

Business software applications include a set of computer programs used by employees to perform business functions. In large business environments, enterprise level software applications, such as enterprise resource planning applications and business process management applications, are commonly used. These applications are typically bundled with multiple services, each of which may be separately purchased by a customer. With the increasing popularity of cloud computing and on-demand software products, many of these business applications and their bundled services may be made available on mobile devices via a cloud service. Because different customers may have access to different bundled services for a particular business application, configuring these business application to operate on mobile devices may be difficult.

SUMMARY

In some implementations, methods and apparatus, including computer program products, are provided for automatically configuring a mobile program on a mobile device.

In one aspect, metadata for one or more mobile programs is maintained in a directory. The one or more mobile programs are configured to provide one or more services when installed on a mobile device. Each of the one or more services are associated with one or more applications. One or more customer landscapes are maintained in the directory. The one or more customer landscapes identify one or more applications accessible by a customer. A program identifier is received from a mobile device of the customer. The program identifier identifies a mobile program installed on the mobile device of the customer. A configuration file is generated based on the received program identifier. The generated configuration file is transmitted to the mobile device of the customer.

The above methods, apparatus, and computer program products may, in some implementations, further include one or more of the following features.

Generating the configuration file may further include accessing, based on the received program identifier, one or more service variants stored in the directory. The one or more service variants may identify a different combination of the one or more services provided by the mobile program. For each of the one or more service variants, applications associated with the combination of services may be identified, and the identified applications may be compared with the one or more applications accessible by the customer. A service variant may be selected based on the comparing.

A service variant may be selected if the applications associated with the combination of services are all accessible by the customer.

The identifying and the comparing of the one or more service variants may be performed in a predetermined order based on a number of services associated with the service variant.

The configuration file may be generated from metadata associated with the selected service variant. The metadata associated with the selected variant may include at least layout information, binding information, version information, and a business usage. The binding information may include at least an endpoint for the application and one or more communication parameters for establishing a connection between the mobile device of the customer and the application.

A notification may be received from the one or more applications. The notification may indicate a status of the application transmitting the notification. An application may be determined to be inactive when the application has not sent the notification after a predetermined period of time or when the notification indicates that the application is unavailable for scheduled maintenance.

An impacted service variant may be identified from the one or more service variants. The impacted service variant may have at least one service associated with the inactive application. The selecting of the impacted service variant may be prohibited. A new solution variant may be selected if the generated configuration file is based on the impacted service variant. A new configuration file may be generated for the new solution variant and transmitted to the mobile device of the customer.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Business applications may be deployed and installed on mobile devices as mobile programs. Each mobile program may include a bundle of services that are associated with one or more applications. Disclosed herein are techniques for automatically configuring a mobile program based on a customer's access to these applications.

Figure 1:
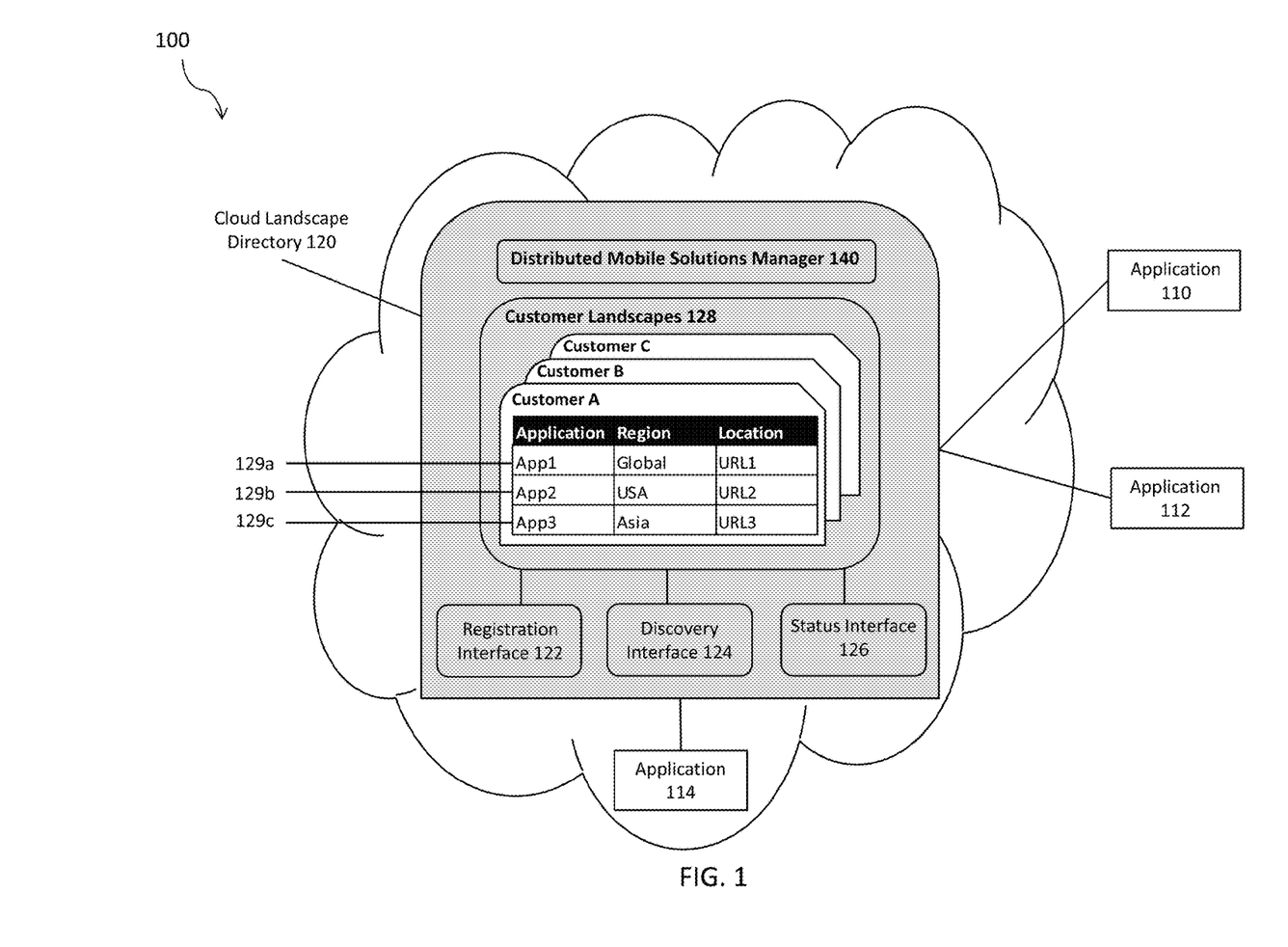
FIG. 1 illustrates a system architecture for cloud based applications and a cloud solution landscape directory.

With reference to FIG. 1, a schematic diagram of a system 100 with applications and a cloud landscape directory 120 is shown. System 100 includes multiple service applications such as applications 110, 112, and 114, that may be distributed in a network, and can be accessed by customers to process requests and tasks. These applications 110, 112, and 114 may be hosted by multiple distributed servers that are interconnected via a network (such the public Internet, private networks, virtual private networks, and the like). These applications 110, 112 and 114 may be on-demand applications (e.g., applications that levy a charge based on use of the applications by customers) or conventional distributed applications that customers may have obtained licenses for. At least one of the applications (e.g., application 114) may be a cloud-based application configured for cloud processing available for use by multiple customers. In some implementations, at least one application (e.g., application 110) may be an on-premise application executing, for example, on a private network (which may be part of the cloud or separate from the cloud). Although FIG. 1 illustrates only three applications, any number of applications may be used.

The cloud landscape directory 120 (also referred to as a cloud landscape directory component, CSLD, cloud solution landscape directory, or landscape directory) enables fully automatic connection of pre-defined and pre-developed components (e.g., components that include other applications and tools) of systems, including customer-specific systems, on-demand systems, and the like. Such system management functionality may be enabled, at least in part, through use of a bundle of interfaces that provide customers access to the customers' shared and private landscape data in the landscape directory. In some implementations, the landscape directory may be implemented on one or more storage devices (which may be distributed) and may be managed or controlled by a commercial or customized data management application. The cloud solution directory may be on-premise (and thus may be run from a customer's on-premise system or sub-system) or may be run from an on-demand platform using an application (e.g., a directory software application) as a service in a hosted mode.

Landscape data at landscape directory 120 may include data that defines the connectivity between various applications and may define separate connectivity configurations for the various customers that use applications 110, 112, and/or 114. For example, the landscape data can identify which applications may communicate with each other (e.g., to transfer data, requests, commands, and the like), whether applications may automatically initiate peer-to-peer communications with other applications without seeking a customer's input, and the like.

Landscape data maintained in the landscape directory 120 may further include registration information for the various applications 110, 112, and 114. An application's registration information may include the application's location (provided, for example, as a uniform resource locator (URL), etc.), release version, business usage (e.g., a human capital management application, a customer relationship management application, and the like), usage type (e.g., whether the application is used for testing or in the course of production), price/charge information, and the like. In some implementations, application registration information maintained in landscape directory 120 may be provided via an interface, such as registration interface 122. Such registration information may be provided by the applications themselves and may also be provided by the customers themselves. In some implementations, this registration information may be included in each of the individual landscapes for the various multiple customers where the respective applications are listed, and/or may be maintained in the landscape directory as a global data record (providing information for the respective applications).

The landscape directory 120 may also be accessed through a discovery interface 124 that enables customers to retrieve information, such as the registration information. Information retrieved via discovery interface 124 may thus be used by customers to subscribe to additional applications with respect to applications whose registration information was retrieved via the discovery interface, modify/edit customers landscape data (e.g., add or delete particular applications, change landscape configurations), and the like.

The landscape directory 120 may also maintain access data pertaining to the accessibility of applications 110, 112, and 114. Such access data may be communicated to landscape directory 120 via, for example, status interface 126 and/or registration interface 122. Access data may include, for example, status and availability information for the various applications. Access data may be received from administrators (e.g., of the cloud, of private networks connected to the cloud, of the applications available on the cloud), from the applications themselves, and/or from the customers. Examples of access data (status/availability information) include information as to whether applications 110, 112, and/or 114 are active, information as to whether downtime is scheduled for these applications, lifecycle status information (e.g., whether the application has been released, is obsolete, has been replaced by another application, and the like), and the like.

In some implementations, the applications 110, 112, and 114 may periodically (e.g., at some pre-defined frequency) send a heartbeat message to landscape directory 120 (e.g., via one of the interfaces facilitating access and management to and of the directory). The heartbeat message may include data indicating that the sending application is still active or inform landscape directory 120 of planned downtime. When it is determined (e.g., by the interface configured to receive the heartbeat message) that no heartbeat message has been received from a particular application during some pre-determined period (which may be the same or different from the pre-determined period for sending messages by the particular application), data indicating that the particular application may no longer be available or inactive may be recorded in landscape directory 120. In some implementations, status and availability information may be recorded separately in each customer's landscape 128. In some implementations, status and availability information may be maintained as a single data record available to all customers and applications.

In some implementations, landscape directory 120 may be configured to maintain individual landscape data for various customers. Customer landscape 128 may define one or more applications that the customer can access. For example, a customer's landscape data may indicate that the customer has access to applications 110 and 114 but not application 112.

The registration data and access data described above may also be stored in the customers' individual landscapes 128. For example, landscape directory 120 may include an example customer landscape 128 (which may be stored in a logical area in memory allocated to store data for that landscape) which, in turn, may include multiple records defining the associated customer's system. Applications 110, 112, and/or 114 may be configured to register themselves in landscape directory 120 on a per-customer basis (i.e., within the landscape 128 of each customer that has access to the application).

For example, FIG. 1 shows three records 129a, 129b, and 129c within a customer landscape 128 for "Customer A." These records may hold registration information for the applications that this customer can access. Record 129a may include the identity of the application (App1), whether the application includes region or country specific data (App1 includes data from anywhere in the globe), and the location of the application (e.g., a URL). Records 129b and 129c may include similar information for applications App2 and App3, respectively. Records 129a, 129b, and 129c may also include status/availability information for each application, the business usage of the application, and the like.

In some implementations, a collection of several callable applications may be bundled together to define a solution. This solution may be deployed and installed on a customer's mobile device as a mobile program. This mobile program may provide one or more services that may each be associated with one or more of applications 110, 112, and/or 114. In order to execute these services, the mobile program may, for example, need data and/or instructions from applications 110, 112, and/or 114.

Figure 2:
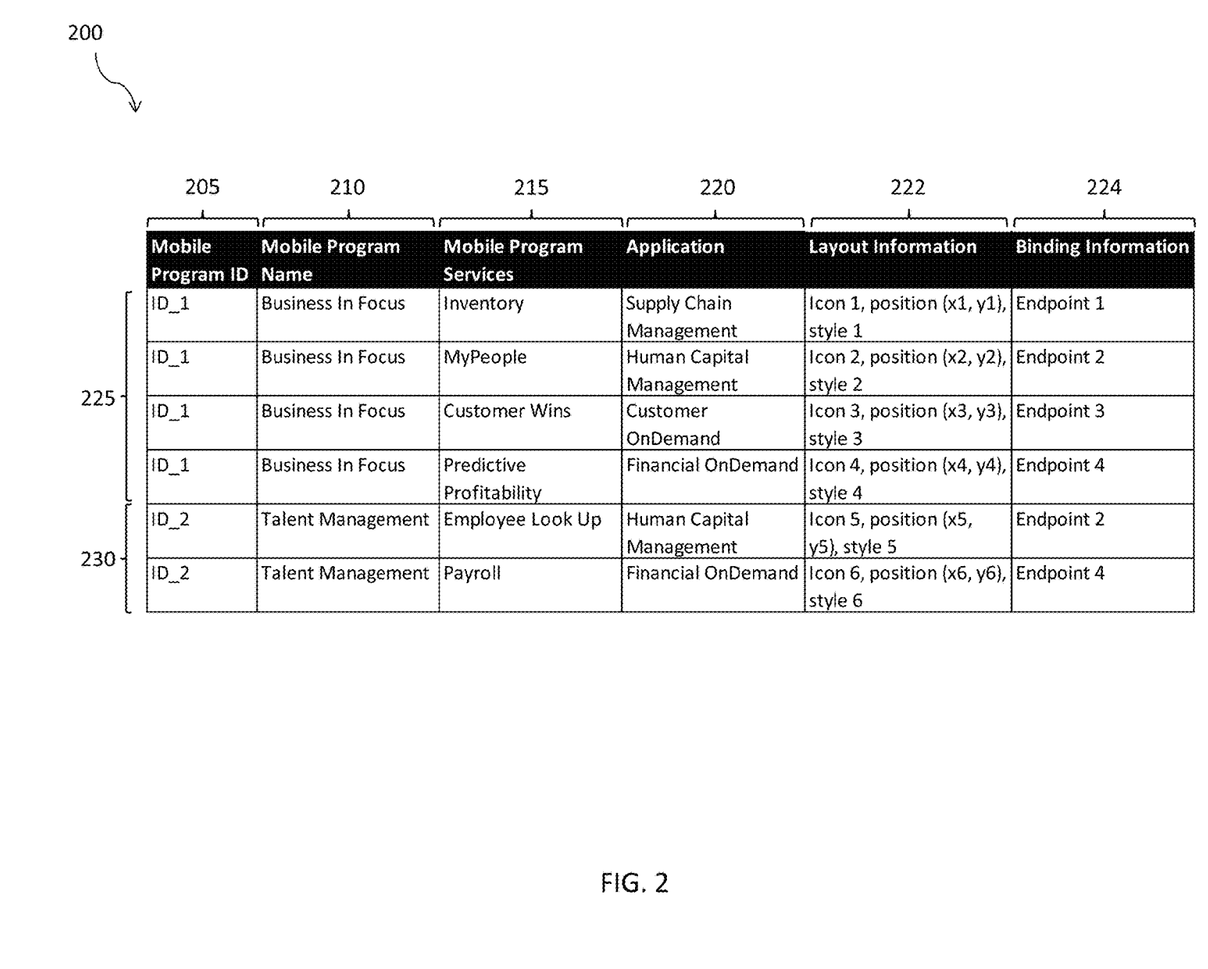
FIG. 2 illustrates metadata for one or more applications associated with the cloud solution landscape directory, in accordance with some example implementations.

Distributed mobile solutions manager 140 in landscape directory 120 may store metadata for each deployable mobile program. Metadata may be created during development of the mobile program and may define the structure and the applications needed to run the mobile program. Table 200 of FIG. 2 illustrates metadata that may be stored for each mobile program.

Table 200 includes mobile programs 225 and 230. Each mobile program may include a bundle of services. The metadata for each mobile program may include a mobile program ID 205 that identifies the mobile program, the name 210 of the mobile program, a list of services 215 provided by the mobile program, and a list of applications 220 that support the execution of these services (e.g., any one of applications 110, 112, and/or 114). Mobile program metadata may further include layout information 222 and binding information 224. Layout information 222 may identify one or more user interface elements that may be used to represent a mobile program service, the arrangement or position of these elements on the display of a mobile device, whether a particular style should be applied to these elements, and the like. Binding information 224 may include one or more communication parameters (e.g., the endpoint or URL of an application) that enable communication between a mobile program installed on a customer's mobile device with one or more of the callable applications. In some implementations, metadata may also include version information and a business usage for each service and/or application associated with the mobile program.

For example, mobile program 225 ("Business In Focus") may have a unique program ID ("ID_1") and provide four different services ("Inventory," "MyPeople," "Customer Wins," and "Predictive Profitability") when installed on a customer's mobile device. Each of the services bundled within mobile program 225 may be associated with a particular application. For example, in order to run the "Inventory" service, the customer may need access to the "Supply Chain Management" application.

Figure 3:
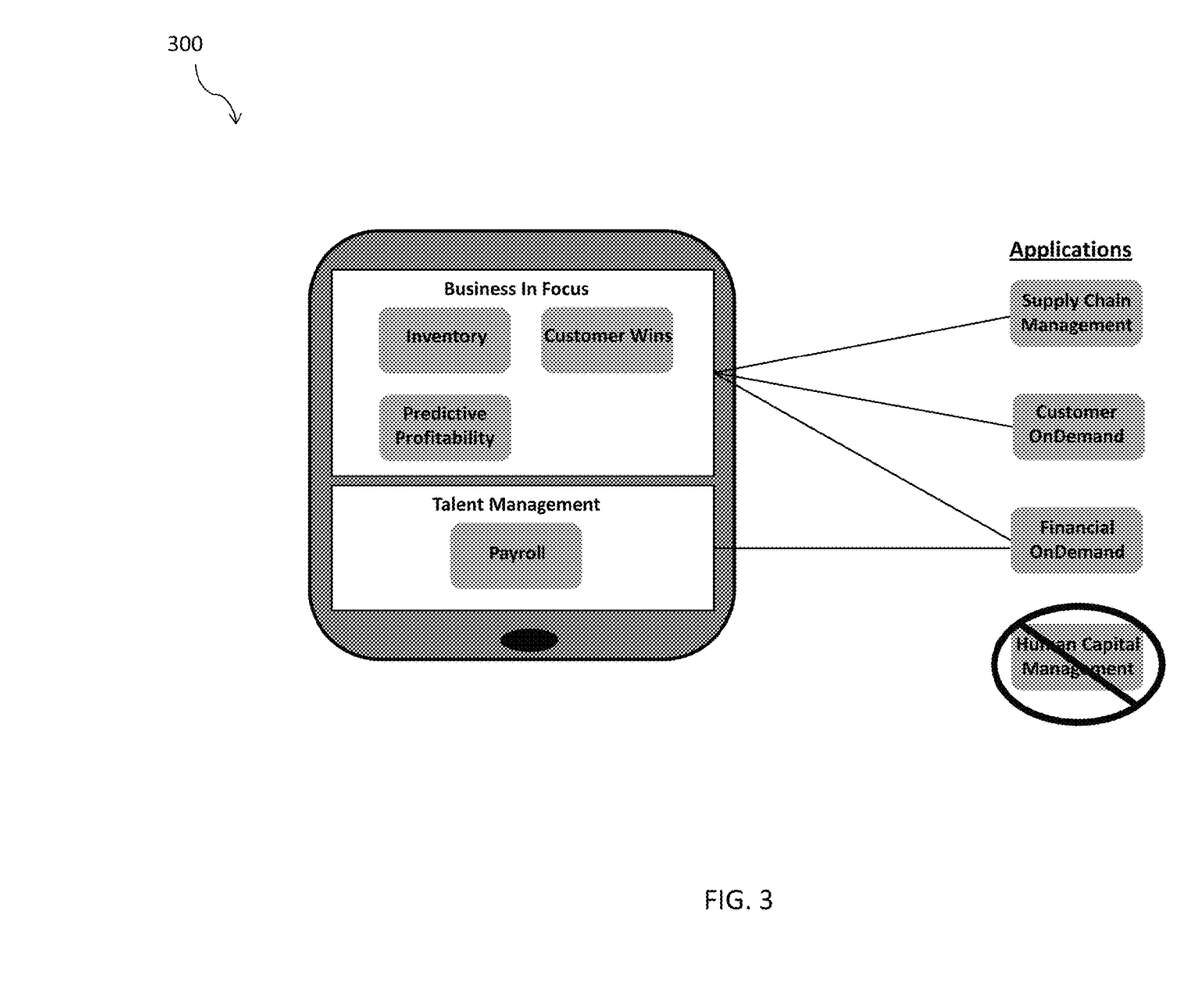
FIG. 3 illustrates a mobile device and mobile programs installed on the mobile device, in accordance with some example implementations.

Depending on which applications 220 a customer has access to, the mobile program installed on the customer's mobile device may be configured to display some or all of the services 215. FIG. 3, for example, illustrates a mobile device 300 installed with the "Business In Focus" and "Talent Management" mobile programs 225 and 230. With regard to the "Business In Focus" mobile program 225, icons are displayed for only three of the four services identified in table 200 (e.g., "Inventory," "Customer Wins," and "Predictive Profitability") and their corresponding applications (e.g., "Supply Chain Management," "Customer OnDemand," and "Financial OnDemand"). These icons may be displayed using the user interface elements, styles, and/or positions identified in layout information 222. An icon for the "MyPeople" service may be absent if, for example, the customer does not have access to the "Human Capital Management" application. Lack of access to this application may also impact "Talent Management" mobile program 230 which may only display an icon for the "Payroll" service. An icon for the "Employee Lookup" service may be omitted because this service may also be associated with the "Human Capital Management" application as illustrated in table 200.

As described above with respect to FIG. 3, the services that are available in a mobile program may depend on whether a customer has access to the corresponding applications. Because different customers may have access to different combinations of applications, each customer may potentially have a different configuration of the same mobile program (e.g., different service bundles for the "Business In Focus" mobile program). In order to ensure that each mobile program is properly configured, distributed mobile solutions manager 140 may generate and transmit a configuration file to each mobile device that accounts for these variations. Upon receiving the configuration file, the mobile device may execute the file to configure its mobile program.

Figure 4:
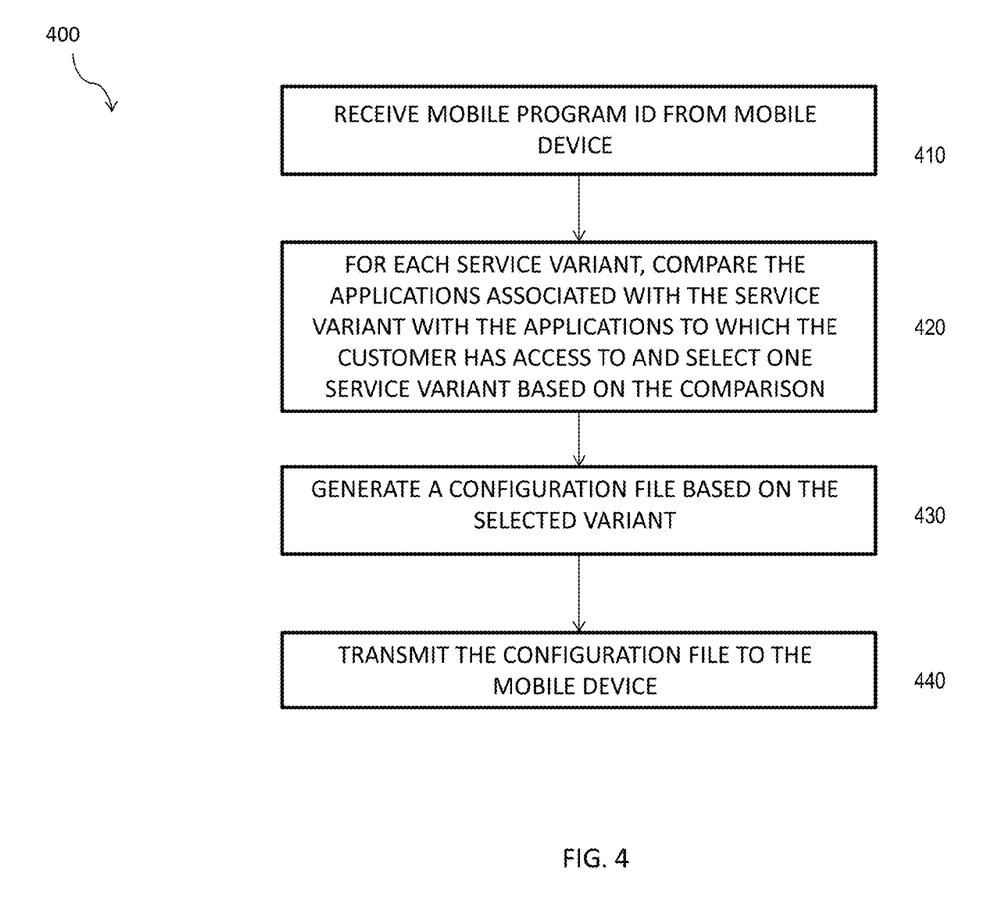
FIG. 4 illustrates a process for generating and transmitting a configuration file to a mobile device, in accordance with some example implementations.

FIG. 4 illustrates a process 400 for generating and transmitting a configuration file to a mobile device. At 410, distributed mobile solutions manager 140 may receive a mobile program ID from a mobile device. Upon receiving the mobile program ID, distributed mobile solutions manager 140 may refer to table 200 to identify the corresponding mobile program. For example, if the received mobile program ID is ID_1, then distributed mobile solutions manager 140 may determine that a customer is requesting a configuration file for the "Business In Focus" mobile program installed on the customer's mobile device.

At 420, distributed mobile solutions manager 140 may access one or more service variants based on the received mobile program ID. A service variant may include a combination of services associated with the mobile program. If, for example, a mobile program is configured to provide services A and B, then there are three possible service variants associated with the mobile program—(1) A and B, (2) A, and (3) B. These service variants may be stored with the metadata for the corresponding mobile program at distributed mobile solutions manager 140.

Figure 5A:
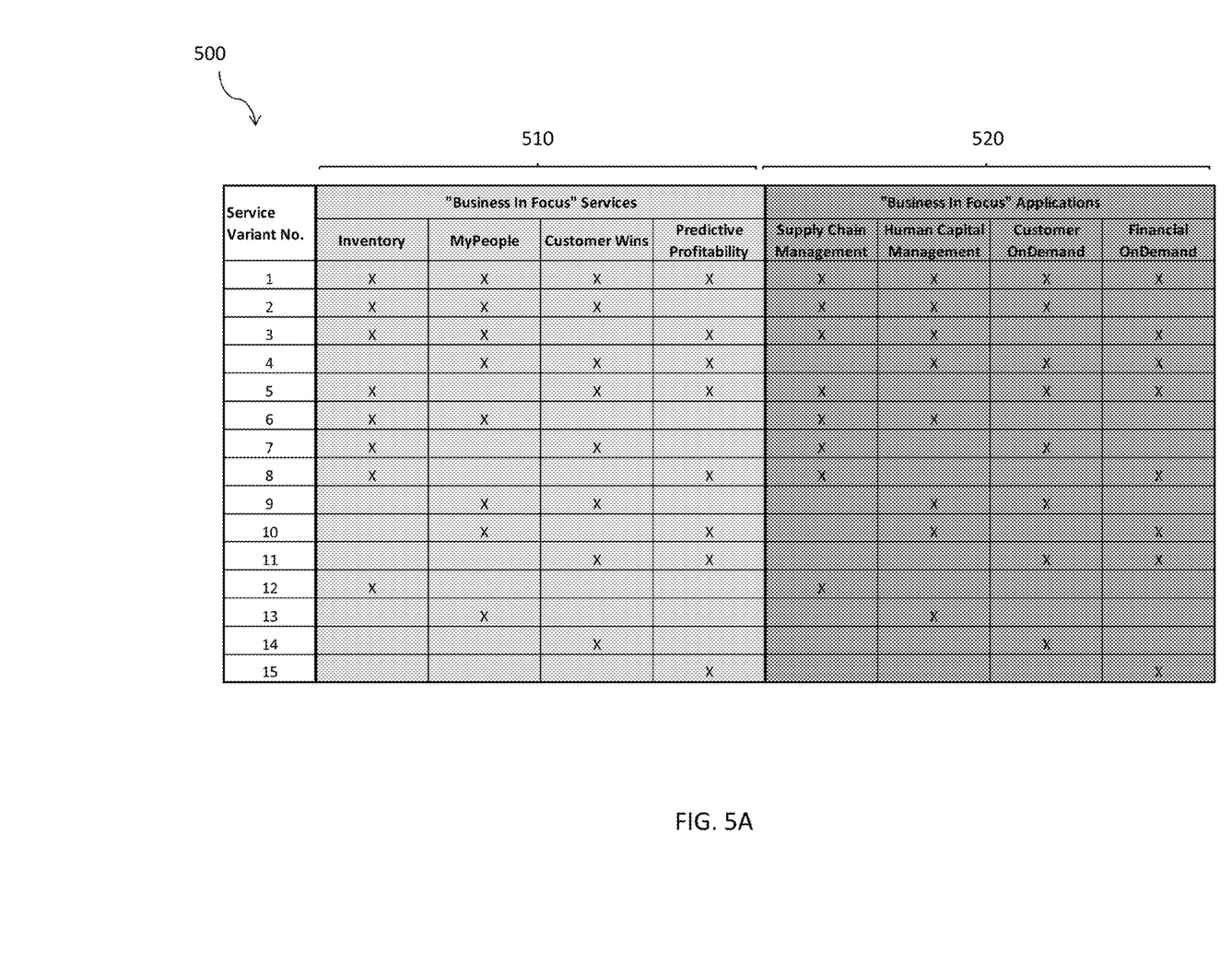
FIG. 5A illustrates a tables of service variants for the "Business In Focus" mobile program, in accordance with some example implementations.

Table 500 of FIG. 5A illustrates different service variants for the "Business In Focus" mobile program 225. As explained above with respect to FIG. 2, the "Business In Focus" mobile program 225 may provide four different services when installed on a customer's mobile device. Each row of table 500 identifies a different combination of these services 510 as identified by the "X" below each service heading. Table 500 also identifies the corresponding applications 520 invoked by each combination of services 510 as denoted by the "X" below each application heading.

For example, the most comprehensive service variant for the "Business In Focus" mobile program 225 may include all four services (i.e., service variant 1). Using the information in table 200, distributed mobile solutions manager 140 may identify the corresponding applications 520 for this combination of services 510. The least comprehensive service variant for the "Business In Focus" mobile program 225 may include a single service 510 (e.g., any of service variants 12, 13, 14, and 15) and its corresponding application 520.

Distributed mobile solutions manager 140 may use the information in table 500 to determine which service variant the configuration file should be based on. Distributed mobile solutions manager 140 may make this determination by comparing each service variant's applications 520 with the applications that the mobile device can access. Because each mobile device belongs to a particular customer, distributed mobile solutions manager 140 may refer to that customer's landscape 128 to identify the applications that the customer can access. Distributed mobile solutions manager 140 may select a service variant if the customer has access to all of the applications associated with the service variant. When this condition is satisfied, a match exists between the applications that a particular customer can access and the applications associated with the service variant.

The comparison process at 420 may be explained with reference to FIG. 3. As described above, mobile device 300 may execute the "Business In Focus" and "Talent Management" mobile programs. With regard to the former, mobile device 300 may only support the "Inventory," "Customer Wins," and "Predictive Profitability" services because the customer only has access to the "Supply Chain Management," "Customer OnDemand," and "Financial OnDemand" applications. Distributed mobile solutions manager 140 may cycle through the service variants in table 500 until it finds a service variant having a matching set of applications 520.

In some implementations, distributed mobile solutions manager 140 may perform this comparison in a predetermined order based, for example, on how comprehensive each service variant is. A service variant that provides more services (e.g., service variant 1) is more comprehensive than a service variant that provides fewer services (e.g., service variants 12, 13, 14, or 15). Table 500, for example, is arranged based on the number of services in each service variant with rows at the top of the table having more services than rows at the bottom of the table. Distributed mobile solutions manager 140 may perform the comparison at process 420 for each service variant as it descends down table 500.

Starting with service variant 1, distributed mobile solutions manager 140 may compare the applications associated with this service variant ("Supply Chain Management," "Human Capital Management," "Customer OnDemand," and "Financial OnDemand") with the applications that this customer has access to ("Supply Chain Management," "Customer OnDemand," and "Financial OnDemand"). Because the customer does not have access to the "Human Capital Management" application in service variant 1, distributed mobile solutions manager 140 can eliminate this service variant from consideration. Distributed mobile solutions manager 140 may eliminate service variants 2, 3, and 4 from consideration for the same reasons as service variant 1.

Moving to service variant 5, distributed mobile solutions manager 140 may compare the applications associated with this service variant ("Supply Chain Management," "Customer OnDemand," and "Financial OnDemand") with the applications that this customer has access to ("Supply Chain Management," "Customer OnDemand," and "Financial OnDemand"). Because the customer has access to each application in service variant 5, the distributed mobile solutions manager 140 can select this service variant as the basis for the configuration file.

At 430, distributed mobile solutions manager 140 may generate a configuration file based on the selected service variant. Distributed mobile solutions manager 140 may, for example, identify the services associated with the selected service variant and gather the metadata for these services. Referring to the example above, once distributed mobile solutions manager 140 selects service variant 5 as the basis for the configuration file, it may refer to table 200 to gather metadata for the "Inventory," "MyPeople," and "Customer Wins" services for this particular mobile program. Upon gathering the metadata for the selected service variant, distributed mobile solutions manager 140 may generate a configuration file.

At 440, distributed mobile solutions manager 140 may transmit the configuration file generated at 430 to the mobile device that sent the mobile program ID. Mobile device 430 may then run the configuration file to update the appearance of the mobile program and its associated services in accordance with the layout information originally specified in the metadata. Mobile device 430 may also update any connection parameters using the binding information (e.g., application endpoints) originally specified in the metadata.

As described above with respect to FIG. 4, distributed mobile solutions manager 140 may generate a configuration file upon receiving a mobile program ID from a mobile device. In some implementations, the generation of a configuration file may be triggered based on the status or availability of a particular application 110, 112, and/or 114 as indicated in an application's heartbeat message.

Figure 5B:
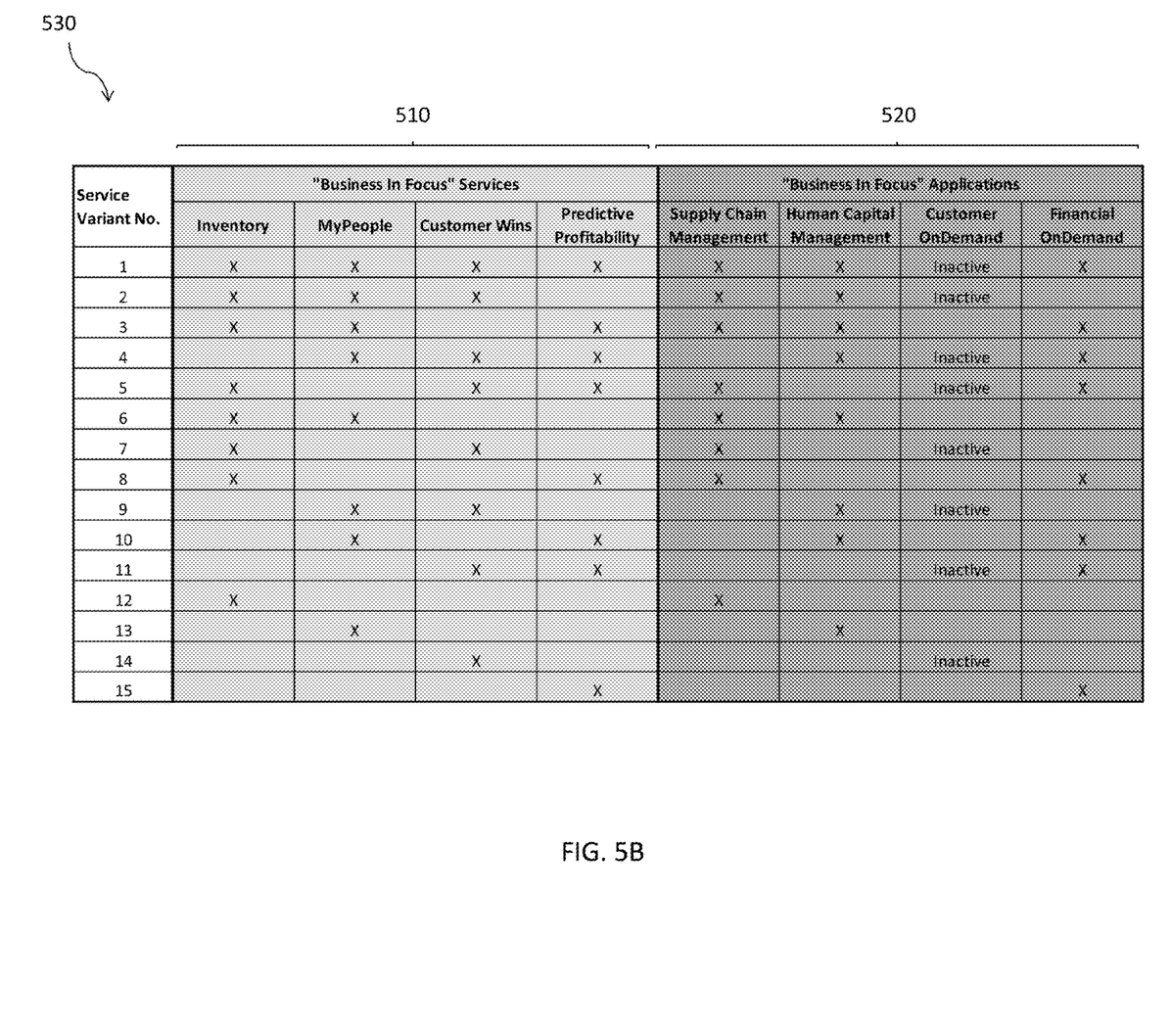
FIG. 5B illustrates a table of service variants for the "Business In Focus" mobile program and application status information, in accordance with some example implementations.

As described above, a heartbeat message may include data indicative of whether the sending application is still active. If, for example, landscape directory 120 does not receive a heartbeat message from an application during a predetermined period of time, data indicating that the particular application is no longer available or inactive may be recorded in the landscape directory. This data may be recorded separately in each customer's landscape 128 or in table 530 as illustrated in FIG. 5B. Table 530 may be similar to table 500 and may additionally include information regarding a particular application's status. In the example of FIG. 5B, the "Customer OnDemand" application may be "Inactive" if, for example, landscape directory 120 has not received a heartbeat message from this application during a given duration of time, or if the heartbeat message indicates that this application is currently offline for scheduled maintenance or planned downtime.

Distributed mobile solutions manager 140 may take an application's status into account when performing the comparison at process 420 by eliminating impacted service variants from consideration. A service variant may be impacted if, for example, the status of one of its applications 520 is "Inactive." In the example of FIG. 5B, distributed mobile solutions manager 140 may eliminate service variants 1, 2, 4, 5, 7, 9, 11, and 14 from consideration when the "Customer OnDemand" application is inactive.

After eliminating the impacted service variants, distributed mobile solutions manager 140 may resume process 420 in the manner described above. Starting with the most comprehensive service variant first, distributed mobile solutions manager 140 may skip eliminated service variants 1 and 2 and begin the comparison process with service variant 3. Distributed mobile solutions manager 140 may compare the service variant's applications with the applications accessible by the customer. If the customer has access to all of the applications in the service variant, then distributed mobile solutions manager 140 may select that service variant as the basis for the configuration file.

Referring again to the example of FIG. 3, a customer may not have access to the "Human Capital Management" application. If the "Customer OnDemand" application is also inactive as illustrated in FIG. 5B, then distributed mobile solutions manager 140 may select service variant service 8 as the basis for the configuration file. At 430, distributed mobile solutions manager 140 may generate the corresponding configuration file using the metadata for this new combination of services.

At 440, distributed mobile solutions manager 140 may transmit the new configuration file to all mobile devices having an installed "Business In Focus" application. In some implementations, distributed mobile solutions manager 140 may transmit the new configuration file to a subset of these customers impacted by the inactive application. These customers can be identified using the information in customer landscapes 128. Once the mobile device runs the configuration file, the appearance of the mobile program may be modified by removing the inactive application and adjusting the connection parameters for the mobile program accordingly. If, for example, the inactive "Customer OnDemand" application later resumes activity and sends a heartbeat message to landscape directory 120 indicating the same, the status of this application can be updated to its original state as illustrated in table 500. The change in status for this application can re-trigger the execution of process 400 to generate another configuration file.

Figure 6:
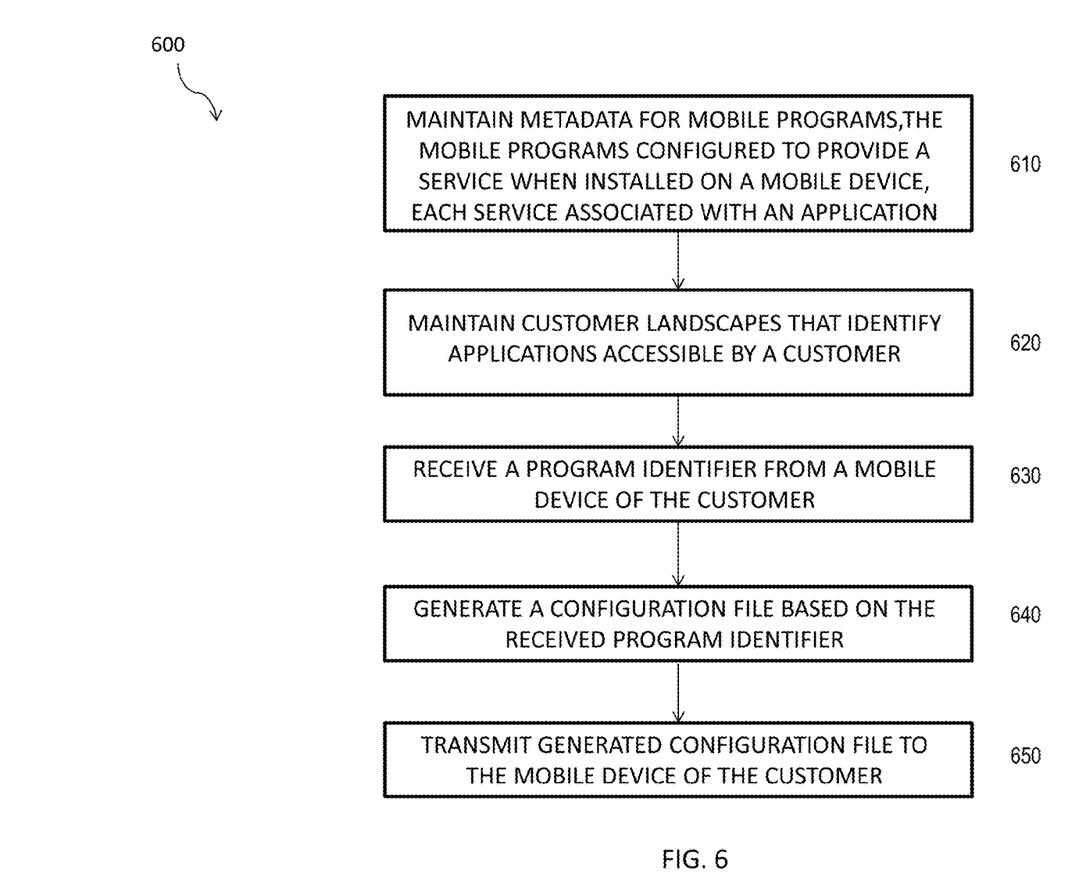
FIG. 6 illustrates a process for generating and transmitting a configuration file to a mobile device, in accordance with some example implementations.

FIG. 6 illustrates a process for generating and transmitting a configuration file to a mobile device.

At 610, metadata for one or more mobile programs may be maintained in a directory. The mobile programs may be configured to provide one or more services when installed on a mobile device, and each service may be associated with one or more applications. The mobile program may, for example, correspond to the "Business In Focus" mobile program described above with respect to FIG. 2. This mobile program may provide four services ("Inventory," "MyPeople," "Customer Wins," and "Predictive Profitability"), and each of these services may rely on data/instructions from an application ("Supply Chain Management," "Human Capital Management," "Customer OnDemand," and "Financial OnDemand"). These applications may correspond to any of applications 110, 112, and/or 114 in FIG. 1. Landscape directory 120 may store metadata for these mobile programs and their corresponding services as illustrated in table 200.

At 620, customer landscapes may be maintained in the directory. The customer landscapes may identify applications accessible by a customer as well as information regarding the applications. This information may include registration information for the applications which can include the application's location, release version, role, business usage, price/charge information, and the like.

At 630, a program identifier may be received from a mobile device belonging to a customer. This program identifier may identify a mobile program installed on the customer's mobile device and may, for example, correspond to mobile program ID 205.

At 640, a configuration file may be generated based on the received program identifier. Distributed mobile solutions manager 140 may generate the configuration file from metadata associated with a service variant of the mobile program. Service variants may represent different combinations of services bundled within a mobile application. Distributed mobile solutions manager 140 may select a service variant if, for example, a customer has access to all of the applications associated with the service variant.

At 650, the configuration file may be transmitted to the mobile device that sent the program identifier. The mobile device can execute the configuration file to update the layout and binding information for the mobile program installed on the mobile device.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A method comprising:
   maintaining metadata for one or more mobile programs in a directory, the one or more mobile programs configured to provide one or more services when installed on a mobile device, each of the one or more services associated with one or more applications;
   maintaining one or more customer landscapes in the directory, the one or more customer landscapes having one or more records, each record associated with a different customer and identifying one or more applications accessible by the customer;
   receiving a program identifier from a mobile device of the customer, the program identifier identifying a mobile program installed on the mobile device of the customer;
   generating a configuration file based on the received program identifier; and
   transmitting the generated configuration file to the mobile device of the customer.

2. The method of claim 1, wherein the generating the configuration file further comprises:
   accessing, based on the received program identifier, one or more service variants stored in the directory, the one or more service variants identifying a different combination of the one or more services provided by the mobile program;
   for each of the one or more service variants
      identifying applications associated with the combination of services, and
      comparing the identified applications with the one or more applications accessible by the customer; and
   selecting a service variant based on the comparing.

3. The method of claim 1, wherein a service variant is selected if the applications associated with the combination of services are all accessible by the customer.

4. The method of claim 1, wherein the identifying and comparing of the one or more service variants are performed in a predetermined order based on a number of services associated with the service variant.

5. The method of claim 1, wherein the configuration file is generated from metadata associated with the selected service variant.

6. The method of claim 5, wherein the metadata associated with the selected variant includes at least layout information and binding information.

7. The method of claim 6, wherein the binding information includes at least an endpoint for each of the one or more applications accessible by the customer and one or more communication parameters for establishing a connection between the mobile device of the customer and each of the one or more applications accessible by the customer.

8. The method of claim 2 further comprising:
   receiving a notification from the one or more applications, the notification indicating a status of the one or more applications transmitting the notification; and
   determining that a first application is inactive when the first application has not sent the notification after a predetermined period of time or when the notification indicates that the first application is unavailable for scheduled maintenance.

9. The method of claim 8 further comprising:
   identifying, from the one or more service variants, an impacted service variant, the impacted service variant having at least one service associated with the inactive application; and
   prohibiting the selecting of the impacted service variant.

10. The method of claim 9 further comprising:
    selecting a new solution variant if the generated configuration file is based on the impacted service variant;
    generating a new configuration file for the new solution variant; and
    transmitting the new configuration file to the mobile device of the customer.

11. A non-transitory computer-readable medium containing instructions to configure a processor to perform operations comprising:
    maintaining metadata for one or more mobile programs in a directory, the one or more mobile programs configured to provide one or more services when installed on a mobile device, each of the one or more services associated with one or more applications;
    maintaining one or more customer landscapes in the directory, the one or more customer landscapes having one or more records, each record associated with a different customer and identifying one or more applications accessible by the customer;
    receiving a program identifier from a mobile device of the customer, the program identifier identifying a mobile program installed on the mobile device of the customer;
    generating a configuration file based on the received program identifier; and
    transmitting the generated configuration file to the mobile device of the customer.

12. The non-transitory computer-readable medium of claim 11, wherein the generating the configuration file further comprises:
    accessing, based on the received program identifier, one or more service variants stored in the directory, the one or more service variants identifying a different combination of the one or more services provided by the mobile program;
    for each of the one or more service variants
       identifying applications associated with the combination of services, and
       comparing the identified applications with the one or more applications accessible by the customer; and
    selecting a service variant based on the comparing.

13. The non-transitory computer-readable medium of claim 12, wherein a service variant is selected if the applications associated with the combination of services are all accessible by the customer.

14. The non-transitory computer-readable medium of claim 12, wherein the identifying and the comparing of the one or more service variants are performed in a predetermined order based on a number of services associated with the service variant.

15. The non-transitory computer-readable medium of claim 12, wherein the configuration file is generated from metadata associated with the selected service variant.

16. A system comprising:
 a processor; and
 a memory, wherein the processor and the memory are configured to perform operations comprising:
  maintaining metadata for one or more mobile programs in a directory, the one or more mobile programs configured to provide one or more services when installed on a mobile device, each of the one or more services associated with one or more applications;
  maintaining one or more customer landscapes in the directory, the one or more customer landscapes having one or more records, each record associated with a different customer and identifying one or more applications accessible by the customer;
  receiving a program identifier from a mobile device of the customer, the program identifier identifying a mobile program installed on the mobile device of the customer;
  generating a configuration file based on the received program identifier; and
  transmitting the generated configuration file to the mobile device of the customer.

17. The system of claim 16, wherein the generating the configuration file further comprises:
 accessing, based on the received program identifier, one or more service variants stored in the directory, the one or more service variants identifying a different combination of the one or more services provided by the mobile program;
 for each of the one or more service variants
  identifying applications associated with the combination of services, and
  comparing the identified applications with the one or more applications accessible by the customer; and
 selecting a service variant based on the comparing.

18. The system of claim 17, wherein a service variant is selected if the applications associated with the combination of services are all accessible by the customer.

19. The system of claim 17, wherein the identifying and the comparing of the one or more service variants are performed in a predetermined order based on a number of services associated with the service variant.

20. The system of claim 17, wherein the configuration file is generated from metadata associated with the selected service variant.

21. A method comprising:
 maintaining a mobile program in a directory, the mobile program configured to provide one or more services when installed on the mobile device, the one or more services being associated with one or more applications;
 maintaining a customer landscape in the directory, the customer landscape having a record associated with a user and identifying a set of user accessible applications that are accessible by the user via the mobile device;
 receiving a program identifier from the mobile device, the program identifier identifying the mobile program installed on the mobile device;
 generating, based on the received program identifier, a configuration file, the generating further comprising:
  accessing, based on the received program identifier, one or more service variants stored in the directory, the one or more service variants each identifying a different combination of the one or more services provided by the mobile program,
  for each of the one or more service variants, identifying a first application of the one or more applications, and comparing the first application with the set of applications that are accessible by the user,
  selecting, based on the comparing, a first service variant of the one or more service variants for the mobile device; and
 transmitting the generated configuration file to the mobile device, the generated configuration file being generated from metadata associated with the selected first service variant.

* * * * *